(12) United States Patent
Hayama et al.

(10) Patent No.: US 7,757,826 B2
(45) Date of Patent: Jul. 20, 2010

(54) DAMPING FORCE ADJUSTABLE FLUID PRESSURE SHOCK ABSORBER

(75) Inventors: Hiroyuki Hayama, Yokohama (JP);
Yohei Katayama, Kawasaki (JP);
Takashi Nezu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 12/076,737

(22) Filed: Mar. 21, 2008

(65) Prior Publication Data
US 2009/0272611 A1 Nov. 5, 2009

(30) Foreign Application Priority Data
Apr. 19, 2007 (JP) ............... 2007-111030

(51) Int. Cl.
*F16F 9/34* (2006.01)
(52) U.S. Cl. ............... 188/282.2; 188/322.22; 188/282.6
(58) Field of Classification Search ........ 188/266, 188/266.1–266.5, 282.1–282.6, 322.15, 322.22
See application file for complete search history.

(56) References Cited

U.S. PATENT DOCUMENTS

| | | | | |
|---|---|---|---|---|
| 5,404,973 A | * | 4/1995 | Katoh et al. | 188/282.1 |
| 5,823,306 A | * | 10/1998 | de Molina | 188/322.15 |
| 6,374,967 B2 | * | 4/2002 | Matsumoto et al. | 188/280 |
| 7,322,449 B2 | * | 1/2008 | Yamaguchi | 188/282.3 |
| 2003/0132073 A1 | * | 7/2003 | Nakadate | 188/282.2 |
| 2005/0263363 A1 | * | 12/2005 | Katou et al. | 188/322.22 |

FOREIGN PATENT DOCUMENTS

JP 2003-278819 10/2003

* cited by examiner

*Primary Examiner*—Christopher P Schwartz
(74) *Attorney, Agent, or Firm*—Wenderoth, Lind & Ponack, L.L.P.

(57) ABSTRACT

A first piston and a second piston coupled to a piston rod are fitted in a cylinder, and an intermediate chamber is formed between the first and second pistons. A compression-side check valve and an extension-side check valve are provided at the first piston and the second piston. An extension-side main valve and a compression-side main valve are disposed in the intermediate chamber. A downstream side of a damping force adjusting valve is connected to the intermediate chamber. Inner pressures of an extension-side backpressure chamber and a compression-side backpressure chamber are adjusted by the damping force adjusting valve, whereby valve opening of the extension-side and compression-side main valves is controlled. Hydraulic fluid of the downstream side of the damping force adjusting valve is first sent into the intermediate chamber, and then is sent to a cylinder upper chamber or a cylinder lower chamber. Due to this arrangement, it is possible to prevent a sudden drastic change in a hydraulic fluid pressure and thereby to generate a stable damping force.

17 Claims, 4 Drawing Sheets

DAMPING FORCE ADJUSTABLE FLUID PRESSURE SHOCK ABSORBER

BACKGROUND OF THE INVENTION

The present invention relates to a damping force adjustable fluid pressure shock absorber in which damping force characteristics can be appropriately adjusted.

As a hydraulic shock absorber mounted on a suspension apparatus of a vehicle such as an automobile, there is known a damping force adjustable hydraulic shock absorber in which damping force characteristics can be appropriately adjusted in accordance with road surface conditions, vehicle running conditions, and the like, so as to improve ride comfort and steering stability.

Generally, a damping force adjustable hydraulic shock absorber comprises a cylinder in which a hydraulic fluid is sealingly contained, a piston rod, and a piston coupled to the piston rod. The piston is slidably fitted in the cylinder so as to divide the inside of the cylinder into two chambers. The piston includes a primary hydraulic fluid passage and a bypass passage through which the two chambers in the cylinder are in communication with each other. A damping force generating mechanism is provided at the primary hydraulic fluid passage. The damping force generating mechanism comprises an orifice, a disk valve and the like. A damping force adjusting valve is provided at the bypass passage. The damping force adjusting valve adjusts the passage area of the bypass passage.

To reduce a damping force, the bypass passage is opened by use of the damping force adjusting valve so as to reduce resistance to a hydraulic fluid flow between the two chambers in the cylinder. To increase a damping force, the bypass passage is closed by use of the damping force adjusting valve so as to increase resistance to a hydraulic fluid flow between the two chambers. In this way, damping force characteristics can be appropriately adjusted by opening or closing the damping force adjusting valve.

However, in a hydraulic shock absorber in which damping force adjustment relies, as described above, on changing only a passage area of a bypass passage, it is possible to change damping force characteristics to a large extent in a low piston speed range. This is because in this range a damping force depends on an orifice dimension of a hydraulic fluid passage. However, it is not possible to change damping force characteristics to a large extent in middle and high piston speed ranges. This is because in these ranges a damping force depends on an opening degree of a damping force generating mechanism (for example, disk valve) provided at a primary hydraulic fluid passage.

With the aim of solving the drawback, for example, Japanese Patent Application Public Disclosure 2003-278819 discloses a damping force adjustable hydraulic shock absorber provided with a pilot type damping valve. In the pilot type damping valve, a backpressure chamber (pilot chamber) is formed at the back of a main valve (disk valve) of a primary hydraulic fluid passage, and the backpressure chamber is in communication through a fixed orifice with a cylinder chamber of an upstream side of the disk valve, and is also in communication through a damping force adjusting valve (pilot control valve) with a cylinder chamber of a downstream side of the disk valve.

According to this damping force adjustable hydraulic shock absorber, the area of the communication passage between the two chambers in the cylinder can be directly adjusted by opening or closing the damping force adjusting valve, and at the same time, the valve-opening pressure of the main valve can be changed by changing the pressure of the backpressure chamber by utilizing pressure loss caused by the damping force adjusting valve. In this way, it is possible to adjust not only orifice characteristics (in which a damping force is approximately proportional to the square of piston speed) but also valve characteristics (in which a damping force is approximately proportional to piston speed), thereby to widen an adjustable range of damping force characteristics.

However, the above-mentioned conventional damping force adjustable hydraulic shock absorber provided with the pilot type damping valve remains subject to the following drawback. Namely, when hydraulic fluid passes through the damping force adjusting valve and enters the cylinder chamber of the downstream side, because the cylinder chamber is being depressurized, the inside of it is liable to a sudden drastic pressure change and therefore bubbles are easily created in the hydraulic fluid, with the possible consequence that an unstable damping force might be generated.

SUMMARY OF THE INVENTION

The present invention has been contrived in consideration of the above-mentioned circumstances, and an object thereof is to provide a damping force adjustable fluid pressure shock absorber in which it is possible to prevent a sudden drastic change in a fluid pressure and thereby to generate a stable damping force.

To achieve the foregoing and other objects, an aspect of the present invention is a damping force adjustable fluid pressure shock absorber comprising:

a cylinder in which a fluid is sealingly contained;

a piston slidably fitted in the cylinder so as to divide an inside of the cylinder into two chambers;

a piston rod having one end coupled to the piston and an opposite end extending to an outside of the cylinder;

an extension-side passage and a compression-side passage through which the two chambers in the cylinder are in communication with each other;

a pilot type damping valve provided at one of the extension-side passage and the compression-side passage, and a damping valve provided at the other of the extension-side passage and the compression-side passage;

a first check valve provided on a downstream side of the pilot type damping valve; and a second check valve provided on a downstream side of the damping valve, wherein a damping force is generated by controlling a fluid flow caused by a sliding movement of the piston in the cylinder by means of the pilot type damping valve and the damping valve, and the damping force can be adjusted by controlling a valve-opening pressure of the pilot type damping-valve by means of a pilot pressure as which a part of the fluid flow is utilized, and by controlling the pilot pressure by means of a damping force adjusting valve;

a first section between the pilot type damping valve and the first check valve is in communication with a second section between the damping valve and the second check valve through the intermediate chamber; and a downstream side of the damping force adjusting valve is connected to the intermediate chamber.

The damping valve may comprise a pilot type damping valve.

The damping force adjusting valve may be prepared for each of the pilot type damping valve at the extension-side passage and the pilot type damping valve at the compression-side passage.

At least one of the first check valve and the second check valve may comprise a pressure control valve to which a preload is applied.

The piston may comprise a first piston and a second piston which are fixed to the piston rod. The intermediate chamber may be defined between the first piston and the second piston. The pilot type damping valve and the damping valve may be disposed in the intermediate chamber. The first check valve may be disposed at the second piston, and the second check valve may be disposed at the first piston.

A member may be disposed between the first piston and the second piston, the member which includes a radially extending passage through which the downstream side of the damping force adjusting valve and the intermediate chamber are in communication with each other.

A pilot chamber of the pilot type damping valve may be defined by the member including the radially extending passage.

Any one of the first piston and the second piston may include a radially extending passage through which the downstream side of the damping force adjusting valve and the intermediate chamber are in communication with each other.

The pilot type damping valve may comprise a disk-shaped main disk, and a plastic packing disposed on a pilot chamber side of the main disk so as to seal the pilot chamber.

Another aspect of the present invention is a damping force adjustable fluid pressure shock absorber, comprising:

a cylinder in which a fluid is sealingly contained;

a piston slidably fitted in the cylinder so as to divide an inside of the cylinder into two chambers;

a piston rod having one end coupled to the piston and an opposite end extending to an outside of the cylinder;

an extension-side passage and a compression-side passage provided at the piston, through which the two chambers in the cylinder are in communication with each other;

an extension-side pilot type damping valve provided at the extension-side passage;

a compression-side pilot type damping valve provided at the compression-side passage;

a first check valve provided on a downstream side of the extension-side pilot type damping valve; and a second check valve provided on a downstream side of the compression-side pilot type damping valve, wherein a damping force is generated by controlling a fluid flow caused by a sliding movement of the piston in the cylinder by means of the extension-side pilot type damping valve and the compression-side pilot type damping valve, and the damping force can be adjusted by controlling a valve-opening pressure of the pilot type damping valve by means of a pilot pressure as which a part of the fluid flow is utilized, and by controlling the pilot pressure by means of a damping force adjusting valve;

a first section between the extension-side pilot type damping valve and the first check valve is in communication with a second section between the compression-side pilot type damping valve and the second check valve through the intermediate chamber; and a downstream side of the damping force adjusting valve is connected to the intermediate chamber.

DETAILED DESCRIPTION OF THE PREFERRED EMBODIMENTS

Hereinafter, embodiments of the present invention will be described in detail with reference to the accompanying drawings.

Figure 1:
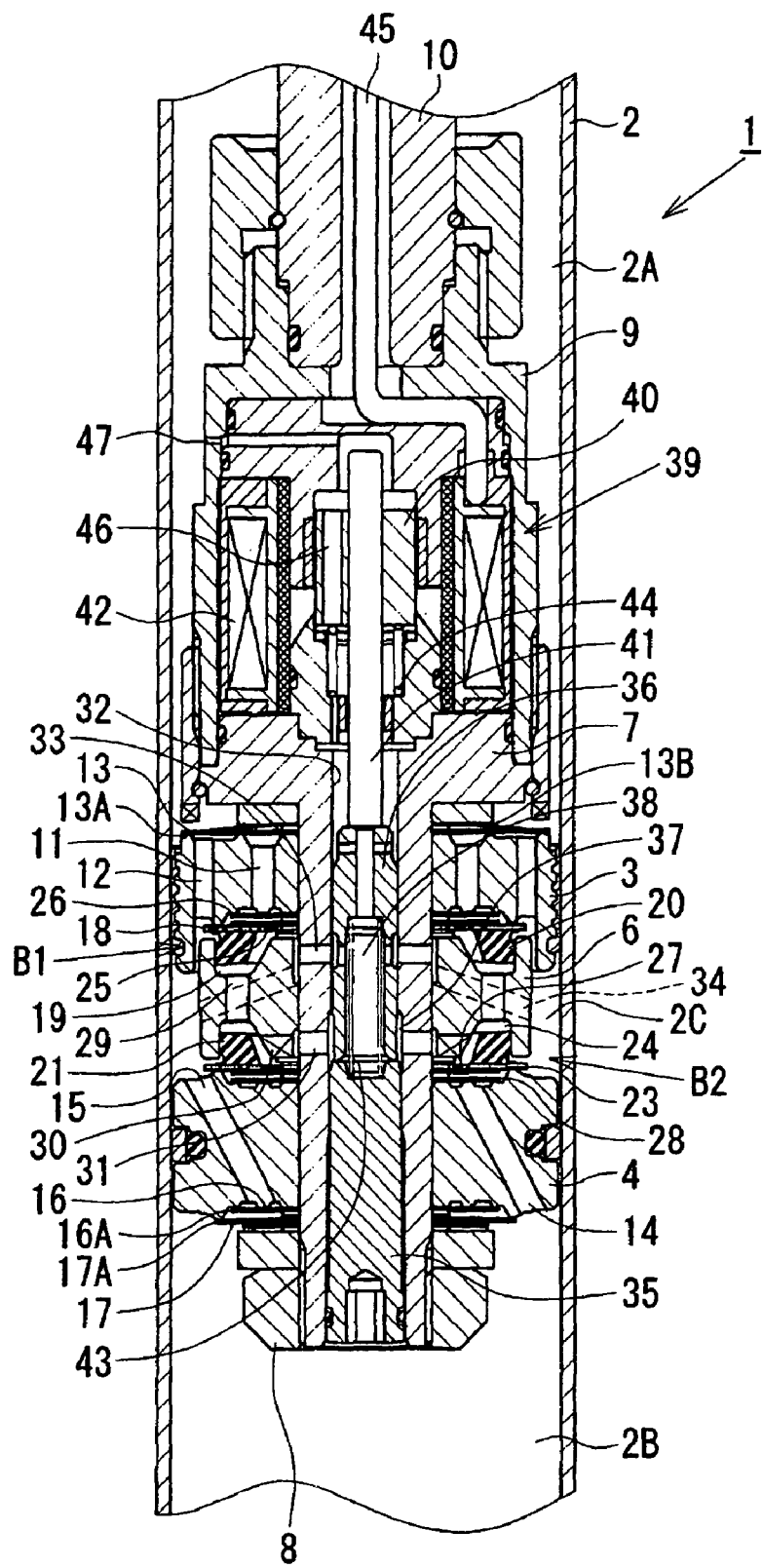
FIG. 1 is a vertical sectional view illustrating main parts of a damping force adjustable hydraulic shock absorber of a first embodiment of the present invention.

FIG. 1 illustrates a first embodiment of the present invention. As shown in FIG. 1, a damping force adjustable hydraulic shock absorber 1 (fluid pressure shock absorber) of the first embodiment is a cylindrical hydraulic shock absorber. A first piston 3 and a second piston 4 are slidably fitted in a cylinder 2. The inside of the cylinder 2 is divided by the first and second pistons 3 and 4 into a cylinder upper chamber 2A and a cylinder lower chamber 2B. Further, an intermediate chamber 2C is defined between the first piston 3 and the second piston 4. A valve member 6 is sandwiched between the first and second pistons 3 and 4. A distal end of a hollow piston bolt 7 (lower portion of the piston bolt 7 in FIG. 1) is inserted through the first piston 3, the valve member 6 and the second piston 4. The distal end of the piston bolt 7 includes a portion extending beyond the second piston 4. A nut 8 is screwed in this portion, whereby the first piston 3, the valve member 6 and the second piston 4 are integrally fixed to the distal end of the piston bolt 7. A case 9 having a substantially bottomed cylindrical form is attached to a proximal end of the piston bolt 7 (upper portion of the piston bolt 7 in FIG. 1). One end of a piston rod 10 is coupled to a bottom of the case 9. The other end of the piston rod 10 is slidably and liquid-tightly inserted through a rod guide (not shown) and an oil seal (not shown) which are attached to an upper end of the cylinder 2, and extends to the outside of the cylinder 2.

A reservoir (accumulator) is connected to a lower end of the cylinder 2 through a base valve (not shown). A hydraulic fluid (oil) is sealingly contained inside the cylinder 2, and hydraulic fluid and a gas are sealingly contained in the reservoir. In some embodiments, a free piston may be slidably fitted on a bottom side of the cylinder 2 so as to define a gas chamber, and a high-pressure gas may be sealingly contained in the gas chamber.

The first piston 3 includes an extension-side passage 11 and a compression-side passage 12 through which the cylinder upper chamber 2A and the intermediate chamber 2C are in communication with each other. An extension-side damping valve B1 (pilot type damping valve) for controlling an hydraulic fluid flow passing through the extension-side passage 11 is provided at a lower end of the first piston 3. A compression-side check valve 13 (second check valve) is provided at an upper end of the first piston 3. The compression-side check valve 13 allows only one-way flow of the hydraulic fluid from the intermediate chamber 2C side to the cylinder upper chamber 2A side of the compression-side passage 12. An orifice 13A (cutout) is provided at the compression-side check valve 13. In some embodiments, the compression-side check valve 13 may be embodied as a pressure control valve to which a preload is applied by a valve spring 13B.

The compression-side check valve 13 includes a circular hole at a position facing the extension-side passage 11. The circular hole enables constant communication between the extension-side passage 11 and the cylinder upper chamber 2A.

The second piston 4 includes a compression-side passage 14 and an extension-side passage 15 through which the cylinder lower chamber 2B and the intermediate chamber 2C are in communication with each other. A compression-side damping valve B2 (damping valve, pilot type damping valve) for controlling an hydraulic fluid flow passing through the compression-side passage 14 is provided at an upper end of the second piston 4. An extension-side check valve 16 (first check valve) and an extension-side sub damping valve 17 (pressure control valve with a preload applied thereto) are provided at a lower end of the second piston 4. The extension-side check valve 16 and the extension-side sub damping valve 17 allow only one-way flow of the hydraulic fluid from the intermediate chamber 2C side to the cylinder lower chamber 2B side of the extension-side passage 15. Orifices 16A and 17A (cutouts) are provided at the extension-side check valve 16 and the extension-side sub damping valve 17, respectively. The orifices 16A and 17A allow two-way (bidirectional) flow of the hydraulic fluid between the intermediate chamber 2C side and the cylinder lower chamber 2B side of the extension-side passage 15.

The extension-side damping valve B1 comprises an extension-side main valve 18 (disk valve) and an extension-side backpressure chamber 19. The extension-side main valve 18 is seated on an annular seat portion formed on a lower end surface of the first piston 3. The extension-side backpressure chamber 19 is defined at the back of the extension-side main valve 18 by the valve member 6. The extension-side main valve 18 is bent to be opened when receiving a certain pressure of the hydraulic fluid in the extension-side passage 11 (cylinder upper chamber 2A). An annular plastic packing 20 fixedly attached to a back surface of the extension-side main valve 18 is slidably and liquid-tightly fitted in an inner circumferential portion of an annular groove 21 provided at an upper end of the valve member 6, whereby the extension-side backpressure chamber 19 is defined therein. An inner pressure of the extension-side backpressure chamber 19 (pilot pressure) acts on the extension-side main valve 18 in a valve-closing direction of the main valve 18.

The compression-side damping valve B2 comprises a compression-side main valve 23 (disk valve) and a compression-side backpressure chamber 24. The compression-side main valve 23 is seated on an annular seat portion formed on an upper end surface of the second piston 4. The compression-side backpressure chamber 24 is defined at the back of the compression-side main valve 23 by the valve member 6. The compression-side main valve 23 is bent to be opened when receiving a certain pressure of the hydraulic fluid in the compression-side passage 14 (cylinder lower chamber 2B). An annular plastic packing 21 fixedly attached to a back surface of the compression-side main valve 23 is slidably and liquid-tightly fitted in an inner circumferential portion of an annular groove provided at a lower end of the valve member 6, whereby the compression-side backpressure chamber 24 is defined therein. An inner pressure of the compression-side backpressure chamber 24 (pilot pressure) acts on the compression-side main valve 23 in a valve-closing direction of the main valve 23.

The extension-side backpressure chamber 19 is in communication with the extension-side passage 11 through an orifice hydraulic fluid passage 25 provided at the extension-side main valve 18. Due to provision of a check valve 26, hydraulic fluid flow is permitted only from the extension-side passage 11 side to the extension-side backpressure chamber 19 side. The compression-side backpressure chamber 24 is in communication with the compression-side passage 14 through an orifice hydraulic fluid passage 27 provided at the compression-side main valve 23. Due to provision of a check valve 28, hydraulic fluid flow is permitted only from the compression-side passage 14 side to the compression-side backpressure chamber 24 side. The extension-side backpressure chamber 19 and the compression-side backpressure chamber 24 are in communication with each other through a communication passage 29.

The extension-side backpressure chamber 19 and the compression-side backpressure chamber 24 are in communication with a guide bore 32 provided in the piston bolt 7 through an hydraulic fluid passage 30 provided at the valve member 6 and a common port 31 provided through a side wall of the hollow piston bolt 7. Further, a port 33 is provided through the side wall of the piston bolt 7. Radially extending hydraulic fluid passages 34 in communication with the port 33 are provided through the valve member 6. The guide bore 32 is in communication with the intermediate chamber 2C through the port 33 and the radially extending hydraulic fluid passages 34.

A seat member 35 is attached to a distal end of the guide bore. A damping force adjusting valve 36 is slidably fitted in the guide bore 32. The damping force adjusting valve 36 causes communication between the ports 31 and 33 to be established or cut off (opened or closed) by being separated from and seated on the seat member 35. The damping force adjusting valve 36 has a reduced diameter on a seat member 35 side, i.e., a distal end side thereof. An annular valve chamber 37 in communication with the port 31 is defined between the distal end side of the damping force adjusting valve 36, which has a reduced diameter, and an inner wall of the piston bolt 7, which defines the guide bore 32. The reduced-size distal end side of the damping force adjusting valve 36 serves as a pressure receiving surface which receives a pressure in the valve chamber 37. The damping force adjusting valve 36 is seated on the seat member 35, thereby causing communication between the ports 31 and 33 to be cut off. On the other hand, the pressure receiving surface of the damping force adjusting valve 36 receives a pressure on the port 31 side, and the valve 36 is separated from the seat member 35, thereby causing communication between the ports 31 and 33 to be established through an internally provided hydraulic fluid passage 38.

An actuating rod 41 abuts against a proximal end of the damping force adjusting valve 36. The actuating rod 41 is coupled to a plunger 40 of a solenoid actuator 39 disposed in the case 9. The solenoid actuator 39 comprises a coil 42. An application of a current to the coil 42 generates a thrust force of the plunger 40 against biasing forces of springs 43 and 44, thereby adjusting a valve-opening pressure of the damping force adjusting valve 36. A lead wire 45 for applying a current to the coil 42 is inserted through a hollow piston rod 10, extending to the outside of the cylinder. The plunger 40 includes a balancing passage 46 which aids in achieving balance between hydraulic pressures at both ends. The base 9 includes an orifice passage 47 on an uppermost portion thereof. Bubbles in hydraulic fluid, which are accumulated in the case 9, are discharged to the cylinder upper chamber 2A through the orifice passage 47.

The first embodiment configured as described above works as follows. During an extension stroke of the piston rod 10, before the extension-side main valve 18 is opened, hydraulic fluid of the cylinder upper chamber 2A side flows through the orifice 13A of the compression-side check valve 13 and the compression-side passage 12 into the intermediate chamber 2C side. In addition, until the extension-side main valve 18 is opened, the hydraulic fluid of the cylinder upper chamber 2A side flows through the circular hole of the compression-side check valve 13, which is provided at a position facing the extension-side passage 11, the extension-side passage 11, the check valve 26, the orifice hydraulic fluid passage 25 provided at the extension-side main valve 18, the extension-side backpressure chamber 19, the communication passage 29, the compression-side backpressure chamber 24, the hydraulic fluid passage 30, and the port 31 into the valve chamber 37. The hydraulic fluid sent into the valve chamber 37 causes the damping force adjusting valve 36 to be opened, and then the hydraulic fluid further flows through the hydraulic fluid passage 38, the port 33, and the radially extending hydraulic fluid passages 34 into the intermediate chamber 2C side. The hydraulic fluid sent into the intermediate chamber 2C flows from the intermediate chamber 2C into the cylinder lower chamber 2B side through the extension-side passage 15 of the second piston 4, the extension-side check valve 16, and the extension-side sub damping valve 17. During this extension-stroke, a damping force is generated by the orifice 13A, the orifice hydraulic fluid passage 25, the damping force adjusting valve 36 and the extension-side sub damping valve 17. Once the pressure of the cylinder upper chamber 2A side reaches a valve-opening pressure of the extension-side main valve 18, the main valve 18 is opened and then the hydraulic fluid starts to flow through the extension-side passage 11 into the intermediate chamber 2C directly. A damping force is generated according to an opening degree of the extension-side main valve 18 at this time.

Application of a current to the coil 42 of the solenoid actuator 39 enables adjustment of the valve-opening pressure of the damping force adjusting valve 36. This adjustment enables direct control of an hydraulic fluid flow between the ports 31 and 33, whereby it becomes possible to adjust a damping force. At the same time, since a pressure in the extension-side backpressure chamber 19 is adjusted by a pressure loss caused by opening of the damping force adjusting valve 36, it becomes possible to control the valve-opening pressure of the extension-side main valve 18.

During a compression stroke of the piston rod 10, before the compression-side main valve 23 is opened, hydraulic fluid of the cylinder lower chamber 2B side flows through the orifice 17A of the extension-side sub damping valve 17, the orifice 16A of the extension-side check valve 16, and the extension-side passage 15 into the intermediate chamber 2C side. In addition, before the compression-side main valve 23 is opened, the hydraulic fluid of the cylinder lower chamber 2B side flows through the compression-side passage 14, the check valve 28, an orifice hydraulic fluid passage 27 provided at the compression-side main valve 23, the compression-side backpressure chamber 24, the hydraulic fluid passage 30, and the port 31 into the valve chamber 37. The hydraulic fluid sent into the valve chamber 37 causes the damping force adjusting valve 36 to be opened, and then the hydraulic fluid further flows through the hydraulic fluid passage 38, the port 33, and the radially extending hydraulic fluid passages 34 into the intermediate chamber 2C side. The hydraulic fluid sent into the intermediate chamber 2C flows from the intermediate chamber 2C into the cylinder upper chamber 2A side through the compression-side passage 12 of the first piston 3 and the compression-side check valve 13. During this compression stroke, a damping force is generated by the orifices 17A and 16A, the orifice hydraulic fluid passage 27 and the damping force adjusting valve 36. Once the pressure of the cylinder lower chamber 2B side reaches a valve-opening pressure of the compression-side main valve 23, the main valve 23 is opened and then the hydraulic fluid starts to flow from compression-side passage 14 into the intermediate chamber 2C directly. A damping force is generated according to an opening degree of the compression-side main valve 23 at this time.

Similarly to an operation at the time of an extension-stroke, application of a current to the coil 42 of the solenoid actuator 39 enables adjustment of the valve-opening pressure of the damping force adjusting valve 36. This adjustment enables direct control of an hydraulic fluid flow between the ports 31 and 33, whereby it becomes possible to adjust a damping force. At the same time, since a pressure in the compression-side backpressure chamber 24 is adjusted by a pressure loss caused by opening of the damping force adjusting valve 36, it becomes possible to control the valve-opening pressure of the compression-side main valve 23. In this way, both of extension-side and compression-side damping forces can be adjusted at the same time by controlling the valve-opening pressure of the common damping force adjusting valve 36.

The route taken by a hydraulic fluid flow traveling from the port 31 to a downstream side after opening of the damping force adjusting valve 36 includes the hydraulic fluid passage 38, the port 33 and the radially extending hydraulic fluid passages 34, and the intermediate chamber 2C. After reaching the intermediate chamber 2C, in the case that the hydraulic fluid flow is caused by an extension stroke, the hydraulic fluid flow passes through the extension-side passage 15 of the second piston 4, the extension-side check valve 16, and the extension-side sub damping valve 17, and reaches the cylinder lower chamber 2B side; in the case that the hydraulic fluid flow is caused by a compression stroke, the hydraulic fluid flow passes through the compression-side passage 12 of the first piston 3 and the compression-side check valve 13, and reaches the cylinder upper chamber 2A side. In this way, hydraulic fluid after passing through the damping force adjusting valve 36 is first sent into the intermediate chamber 2C, and then is sent into the depressurized cylinder upper chamber 2A or cylinder lower chamber 2B, whereby it becomes possible to prevent a sudden drastic change in a pressure and bubble occurrence in hydraulic fluid, and thereby possible to generate a stable damping force. The compression-side check valve 13 may be embodied as a pressure control valve to which a preload is applied. In addition, a preload is also applied to the extension-side sub damping valve 17. Therefore, it becomes possible to effectively restrain a sudden drastic change in a pressure in the intermediate chamber 2C, which otherwise could be caused by a sliding movement of the first and second pistons 3 and 4.

Figure 2:
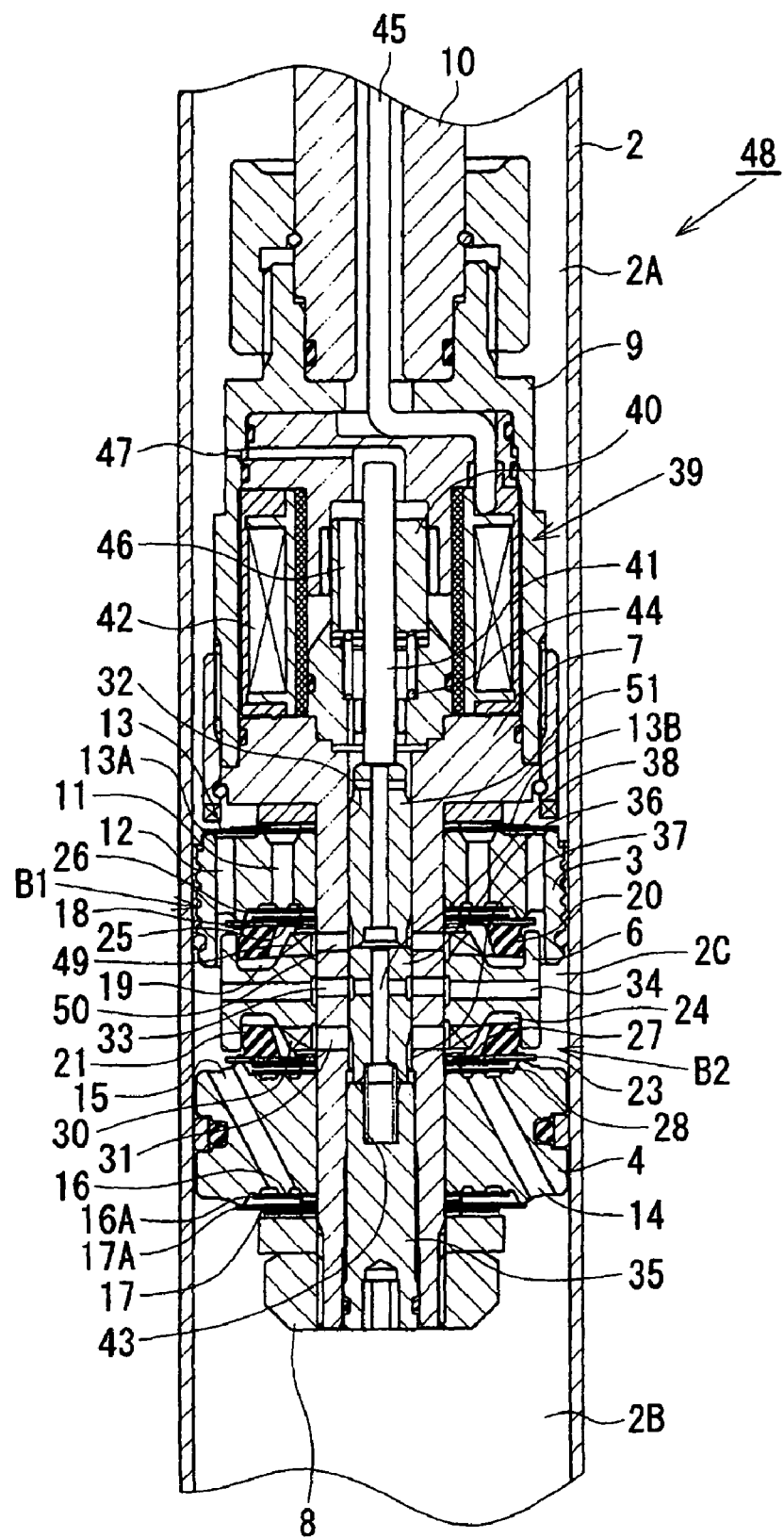
FIG. 2 is a vertical sectional view illustrating main parts of a damping force adjustable hydraulic shock absorber of a second embodiment of the present invention.

Referring to FIG. 2, a second embodiment of the present invention will be described below. Elements corresponding to the elements in the above-discussed first embodiment will be denoted by the same reference numerals as those in the first embodiment, and detailed description will be made below only as to elements and features that are different from or absent in the first embodiment.

As shown in FIG. 2, in a hydraulic shock absorber 48 of the second embodiment, an extension-side backpressure chamber 19 is not in direct communication with a compression-side backpressure chamber 24, but is in communication with a guide bore 32 through an hydraulic fluid passage 49 of a valve member 6 and an extension-side port 50 provided through a side wall of a piston bolt 7. An extension-side damping force adjusting valve 51, in addition to a (compression-side) damping force adjusting valve 36, is slidably fitted in the guide bore 32. While the damping force adjusting valve 36 works to open and close the communication between a (compression-side) port 31 and a port 33, the damping force adjusting valve 51 works to open and close the communication between the extension-side port 50 and the port 33. The extension-side damping force adjusting valve 51 is interposed between the (compression-side) damping force adjusting valve 36 and an actuating rod 41. A distal end of the extension-side damping force adjusting valve 51 causes communication between the extension-side port 50 and the port 33 to be cut off by being seated on a seat portion formed at a proximal end of the (compression-side) damping force adjusting valve 36, and causes communication between the extension-side port 50 and the port 33 to be established by receiving a pressure in the extension-side port 50 and moving away from the seat portion.

The second embodiment configured as described above works as follows. During an extension stroke of a piston rod 10, hydraulic fluid flowed into the extension-side backpressure chamber 19 flows through the hydraulic fluid passage 49 and the extension-side port 50, opens the extension-side damping force adjusting valve 51, and flows through the port 33 and radially extending hydraulic fluid passages 34 into an intermediate chamber 2C. Therefore, the same effect as that of the above-described first embodiment can be brought about. A specific advantage of the second embodiment is that it is possible to enhance flexibility in setting of damping force characteristics of the extension-side and the compression-side, since valve-opening characteristics of the (compression side) damping force adjusting valve 36 and the extension-side damping force adjusting valve 51 can be changed.

Figure 3:
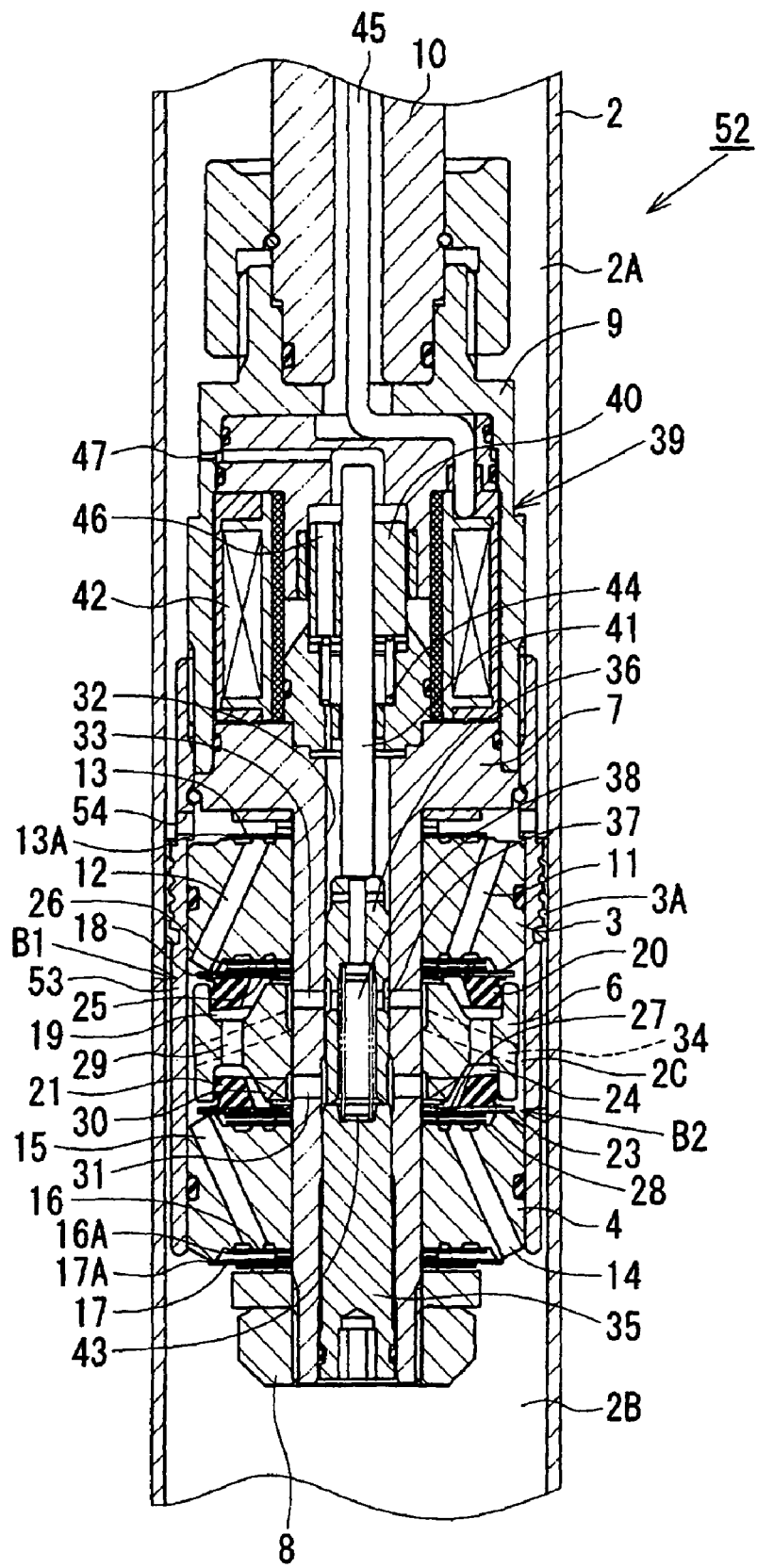
FIG. 3 is a vertical sectional view illustrating main parts of a damping force adjustable hydraulic shock absorber of a third embodiment of the present invention.

Referring to FIG. 3, a third embodiment of the present invention will be described below. Elements corresponding to the elements in the before-discussed first embodiment will be denoted by the same reference numerals as those in the first embodiment, and detailed description will be made below only as to elements and features that are different from or absent in the first embodiment.

As shown in FIG. 3, in a hydraulic shock absorber 52 of the third embodiment, a cylindrical piston member 53 is attached to a case 9. The piston member 53 is liquid-tightly fitted around outer circumferential portions of a first piston 3 and a second piston 4. An outer circumferential portion of the piston member 53 is slidably fitted in a cylinder 2. By this configuration, the first piston 3 and the second piston 4 are integrally formed as one case piece, and an intermediate chamber 2C is defined among the first piston 3, the second piston 4 and the piston member 53. An hydraulic fluid passage 54, through which an extension-side passage 11 and a compression-side passage 12 of the first piston 3 are in communication with a cylinder upper chamber 2A, is provided through a side wall of the piston member 53. The third embodiment configured as described above can bring about the same effect as that of the before-described first embodiment.

A specific advantage of the third embodiment is that it is possible to reduce sliding resistance as compared to the first and second embodiments, since the piston portion contacts an inner surface of the piston 2 only at a seal band 3A disposed on an outer surface of the piston portion.

Figure 4:
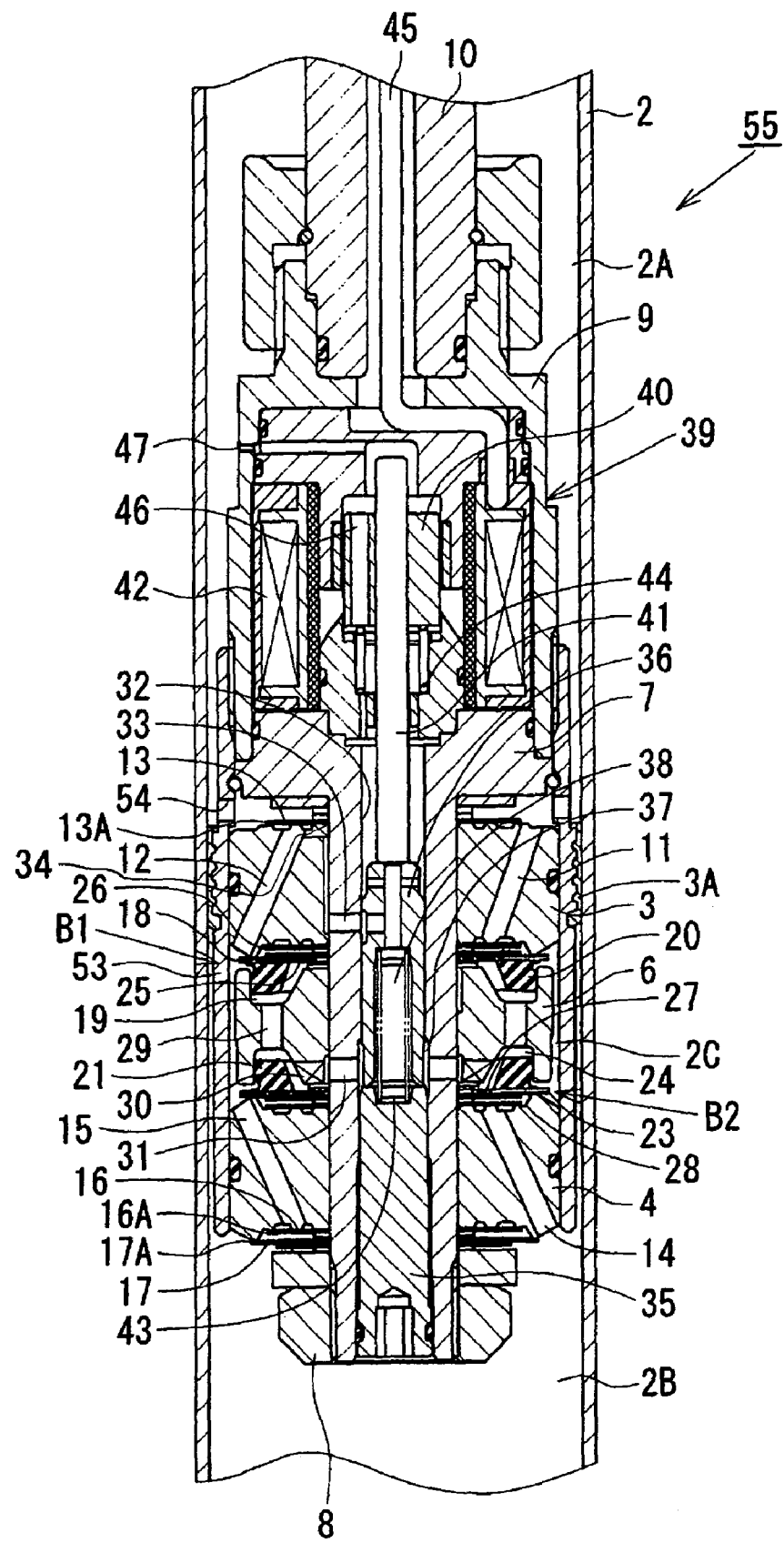
FIG. 4 is a vertical sectional view illustrating main parts of a damping force adjustable hydraulic shock absorber of a fourth embodiment of the present invention.

Referring to FIG. 4, a fourth embodiment of the present invention will be described below. Elements corresponding to the elements in the above-discussed third embodiment will be denoted by the same reference numerals as those in the third embodiment, and detailed description will be made below only as to elements and features that are different from or absent in the third embodiment.

As shown in FIG. 4, in a hydraulic shock absorber 55 of the fourth embodiment, radially extending hydraulic fluid passages 34 are provided at an axial end of a first piston 3, instead of being provided at a valve member 6. Each radially outer end of the radially extending hydraulic fluid passages 34 is in communication with an intermediate chamber 2C through a compression-side passage 12. Each radially inner end of the radially extending hydraulic fluid passages 34 is in communication with a port 33 through a groove provided at an inner surface of the first piston 3. The radially extending hydraulic fluid passages 34 may be provided at an axial end of a second piston 4. In this case, the radially extending hydraulic fluid passages 34 may be provided such that a compression-side passage 15 and an internally provided hydraulic fluid passage 38 are in communication with each other through the passage 34.

The fourth embodiment configured as described above can bring about the same effect as the above-discussed third embodiment. A specific advantage of the fourth embodiment is that it is possible to omit extra processing of the valve member 6, which would be necessary in the case of providing the radially extending hydraulic fluid passages at the valve member 6, resulting in reduced manufacturing cost as compared to the first to third embodiments.

The above-described first to fourth embodiments include the extension-side damping valve B1 and the compression-side damping valve B2 provided at the piston portion. In other embodiments, these damping valves may be provided at a portion other than a piston portion, as long as they are positioned at a passage through which a fluid flow is caused by a sliding movement of a piston in the cylinder. For example, a passage through which a cylinder upper chamber and a cylinder lower chamber are in communication with each other may be provided outside a cylinder, and a damping valve may be provided at this passage.

In the above-described first to fourth embodiments, the hydraulic shock absorbers generate a damping force by controlling an hydraulic fluid flow. However, these embodiments do not limit the present invention, and a hydraulic shock absorber embodying the present invention may generate a damping force by controlling a flow of another kind of fluid such as a gas.

According to the damping force adjustable fluid pressure shock absorbers of the above-discussed embodiments, after passing through the damping force adjusting valve, fluid is first sent into the intermediate chamber, and then is sent into the inner-cylinder chamber defined by the piston through the first or the second check valve. Therefore, it is possible to prevent a sudden drastic change in a fluid pressure and generate a stable damping force.

According to the damping force adjustable fluid pressure shock absorbers of the above-discussed embodiments, it is possible to generate both of extension-side and compression-side damping forces by means of a pilot type damping valve.

According to the damping force adjustable fluid pressure shock absorbers of the above-discussed embodiments, it is possible to adjust extension-side and compression-side damping forces by their respective damping force adjusting valves.

According to the damping force adjustable fluid pressure shock absorbers of the above-discussed embodiments, it is possible to effectively prevent a sudden drastic pressure change in the intermediate chamber by utilizing a preload applied to the first or/and second check valve.

According to the damping force adjustable fluid pressure shock absorbers of the above-discussed embodiments, it is possible to define the intermediate chamber in the cylinder by the two pistons.

According to the damping force adjustable fluid pressure shock absorbers of the above-discussed embodiments, it is possible to easily form a radially extending passage between the two pistons.

According to the damping force adjustable fluid pressure shock absorbers of the above-discussed embodiments, it is possible to use a same member for forming a radially extending passage and a pilot chamber, and therefore possible to reduce the axial dimension.

According to the damping force adjustable fluid pressure shock absorbers of the above-discussed embodiments, it is possible to generate a more stable damping force since the packing receives only a pressure in the intermediate chamber.

According to the damping force adjustable fluid pressure shock absorbers of the above-discussed embodiments, it is possible to realize a more simple structure since the above discussed configuration can be employed at the piston portion.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-111030, filed on Apr. 19, 2007.

The entire disclosure of Japanese Patent Application No. 2007-111030 filed on Apr. 19, 2007 including specification, claims, drawings and summary is incorporated herein by reference in its entirety.

What is claimed is:

1. A damping force adjustable fluid pressure shock absorber, comprising:
   a cylinder in which a fluid is sealingly contained;
   a piston slidably fitted in the cylinder so as to divide an inside of the cylinder into two chambers;
   a piston rod having one end coupled to the piston and an opposite end extending to an outside of the cylinder;
   an extension-side passage and a compression-side passage through which the two chambers in the cylinder are in communication with each other;
   a pilot type damping valve provided at one of the extension-side passage and the compression-side passage, and a damping valve provided at the other of the extension-side passage and the compression-side passage;
   a first check valve provided on a downstream side of the pilot type damping valve and provided at the one of the passages so as to be arranged in series with the pilot type damping valve; and
   a second check valve provided on a downstream side of the damping valve and provided at the other of the passages so as to be arranged in series with the damping valve,
   wherein a damping force is generated by controlling a fluid flow caused by a sliding movement of the piston in the cylinder by means of the pilot type damping valve and the damping valve, and the damping force can be adjusted by controlling a valve-opening pressure of the pilot type damping valve by means of a pilot pressure as which a part of the fluid flow is utilized, and by controlling the pilot pressure by means of a damping force adjusting valve; and
   an intermediate chamber through which a first section between the pilot type damping valve and the first check valve is in communication with a second section between the damping valve and the second check valve,
   a downstream side of the damping force adjusting valve being connected to the intermediate chamber.

2. The damping force adjustable fluid pressure shock absorber according to claim 1, wherein the damping valve is a pilot type damping valve.

3. The damping force adjustable fluid pressure shock absorber according to claim 2, wherein the damping force adjusting valve is prepared for each of the pilot type damping valve at the extension-side passage and the pilot type damping valve at the compression-side passage.

4. The damping force adjustable fluid pressure shock absorber according to claim 1, wherein at least one of the first check valve and the second check valve is a pressure control valve to which a preload is applied.

5. The damping force adjustable fluid pressure shock absorber according to claim 1, wherein:
   the piston comprises a first piston and a second piston which are fixed to the piston rod, the first piston and the second piston defining the intermediate chamber therebetween;
   the pilot type damping valve and the damping valve are disposed in the intermediate chamber; and
   the first check valve is disposed at the second piston, and the second check valve is disposed at the first piston.

6. The damping force adjustable fluid pressure shock absorber according to claim 5, further comprising a member disposed between the first piston and the second piston, the member including a radially extending passage through which the downstream side of the damping force adjusting valve and the intermediate chamber are in communication with each other.

7. The damping force adjustable fluid pressure shock absorber according to claim 6, wherein a pilot chamber of the pilot type damping valve is defined by the member including the radially extending passage.

8. The damping force adjustable fluid pressure shock absorber according to claim 5, wherein any one of the first piston and the second piston includes a radially extending passage through which the downstream side of the damping force adjusting valve and the intermediate chamber are in communication with each other.

9. The damping force adjustable fluid pressure shock absorber according to claim 1, wherein the pilot type damping valve comprises a disk-shaped main disk, and a plastic packing disposed on a pilot chamber side of the main disk so as to seal the pilot chamber.

10. A damping force adjustable fluid pressure shock absorber, comprising:
    a cylinder in which a fluid is sealingly contained;
    a piston slidably fitted in the cylinder so as to divide an inside of the cylinder into two chambers;
    a piston rod having one end coupled to the piston and an opposite end extending to an outside of the cylinder;
    an extension-side passage and a compression-side passage provided at the piston, through which the two chambers in the cylinder are in communication with each other;
    an extension-side pilot type damping valve provided at the extension-side passage;
    a compression-side pilot type damping valve provided at the compression-side passage;
    a first check valve provided on a downstream side of the extension-side pilot type damping valve and provided at the extension-side passage so as to be arranged in series with the extension-side pilot type damping valve; and
    a second check valve provided on a downstream side of the compression-side pilot type damping valve and provided at the compression-side passage so as to be arranged in series with the compression-side pilot type damping valve, wherein a damping force is generated by controlling a fluid flow caused by a sliding movement of the piston in the cylinder by means of the extension-side pilot type damping valve and the compression-side pilot type damping valve, and the damping force can be adjusted by controlling a valve-opening pressure of the pilot type damping valve by means of a pilot pressure as which a part of the fluid flow is utilized, and by controlling the pilot pressure by means of a damping force adjusting valve; and an intermediate chamber through which a first section between the extension-side pilot type damping valve and the first check valve is in communication with a second section between the compression-side pilot type damping valve and the second check valve, a downstream side of the damping force adjusting valve being connected to the intermediate chamber.

11. The damping force adjustable fluid pressure shock absorber according to claim 10, wherein the damping force adjusting valve is prepared for each of the extension-side pilot type damping valve and the compression-side pilot type damping valve.

12. The damping force adjustable fluid pressure shock absorber according to claim 10, wherein at least one of the first check valve and the second check valve is a pressure control valve to which a preload is applied.

13. The damping force adjustable fluid pressure shock absorber according to claim 10, wherein:

the piston comprises a first piston and a second piston which are fixed to the piston rod, the first piston and the second piston defining the intermediate chamber therebetween;

the extension-side pilot type damping valve and the compression-side pilot type damping valve are disposed in the intermediate chamber; and the first check valve is disposed at the second piston, and the second check valve is disposed at the first piston.

14. The damping force adjustable fluid pressure shock absorber according to claim 13, wherein any one of the first piston and the second piston includes a radially extending passage through which the downstream side of the damping force adjusting valve and the intermediate chamber are in communication with each other.

15. The damping force adjustable fluid pressure shock absorber according to claim 10, further comprising a member disposed between the first piston and the second piston, the member including a radially extending passage through which the downstream side of the damping force adjusting valve and the intermediate chamber are in communication with each other.

16. The damping force adjustable fluid pressure shock absorber according to claim 15, wherein a pilot chamber of the pilot type damping valve is defined by the member including the radially extending passage.

17. The damping force adjustable fluid pressure shock absorber according to claim 10, wherein the pilot type damping valve comprises a disk-shaped main disk, and a plastic packing disposed on a pilot chamber side of the main disk so as to seal the pilot chamber.

* * * * *